(12) United States Patent
Amtmann et al.

(10) Patent No.: US 9,764,425 B2
(45) Date of Patent: Sep. 19, 2017

(54) PROCESS FOR LASER-ASSISTED TOOL BUILD AND REPAIR

(71) Applicant: Magna International Inc., Aurora (CA)

(72) Inventors: Maximilian Amtmann, Brampton (CA); Hongping Gu, Newmarket (CA); Boris Shulkin, West Bloomfield, MI (US); Aldo Van Gelder, Newmarket (CA)

(73) Assignee: Magna International Inc., Aurora (CA)

( * ) Notice: Subject to any disclaimer, the term of this patent is extended or adjusted under 35 U.S.C. 154(b) by 225 days.

(21) Appl. No.: 14/394,659

(22) PCT Filed: Apr. 4, 2013

(86) PCT No.: PCT/CA2013/000321
§ 371 (c)(1),
(2) Date: Oct. 15, 2014

(87) PCT Pub. No.: WO2013/155591
PCT Pub. Date: Oct. 24, 2013

(65) Prior Publication Data
US 2015/0089992 A1 Apr. 2, 2015

Related U.S. Application Data

(60) Provisional application No. 61/624,562, filed on Apr. 16, 2012.

(51) Int. Cl.
*B23K 26/34* (2014.01)
*B23P 15/24* (2006.01)
(Continued)

(52) U.S. Cl.
CPC .............. *B23K 26/34* (2013.01); *B21D 22/00* (2013.01); *B23K 26/32* (2013.01); *B23K 26/342* (2015.10);
(Continued)

(58) Field of Classification Search
CPC .... B23K 2203/50; B23K 26/32; B23K 26/34; B23P 15/24; B23P 6/00; B23P 15/406;
(Continued)

(56) References Cited

U.S. PATENT DOCUMENTS 5,837,960 A * 11/1998 Lewis .................... B23K 26/34
219/121.63
6,122,564 A 9/2000 Koch et al.
(Continued)

FOREIGN PATENT DOCUMENTS

CN 1222106 A 7/1999
CN 202052935 U 11/2011
(Continued)

OTHER PUBLICATIONS

Zhu Jun, English Translation of Notification of the First Office Action for Chinese Application No. 201380020171.4 Mar. 1, 2016.

*Primary Examiner* — Peter DungBa Vo
*Assistant Examiner* — John S Lowe
(74) *Attorney, Agent, or Firm* — Middleton Reutlinger (57) ABSTRACT

A tool for forming a shaped product has a support body that is fabricated from a first material, such as for instance cast iron. The first material defines a first portion of a forming surface of the tool and has a feature supported thereon. The feature has a layer of a second material that is supported on the first material of the support body, a layer of a third material that is supported on the layer of the second material and a layer of a fourth material that is supported on the layer of the third material. The layer of the fourth material, such (Continued)

as for instance a tool steel alloy, defines a second portion of the forming surface of the tool. During use the first portion of the forming surface and the second portion of the forming surface cooperate to form a desired shape of the shaped product.

13 Claims, 8 Drawing Sheets (51) Int. Cl.
```
B23P 6/00       (2006.01)
B21D 22/00      (2006.01)
B23K 26/32      (2014.01)
B23K 26/342     (2014.01)
B23K 35/02      (2006.01)
B23K 103/02     (2006.01)
B22F 3/105      (2006.01)
B23K 35/30      (2006.01)
B22F 5/00       (2006.01)
B22F 7/06       (2006.01)
B32B 15/01      (2006.01)
B23K 103/08     (2006.01)
B23K 103/00     (2006.01)
B23K 103/18     (2006.01)
```
(52) U.S. Cl.
CPC ...... *B23K 35/0244* (2013.01); *B23K 35/3053* (2013.01); *B23P 6/00* (2013.01); *B23P 15/24* (2013.01); *B22F 3/1055* (2013.01); *B22F 2005/001* (2013.01); *B22F 2007/068* (2013.01); *B23K 35/3046* (2013.01); *B23K 2203/02* (2013.01); *B23K 2203/08* (2013.01); *B23K 2203/26* (2015.10); *B23K 2203/50* (2015.10); *B32B 15/01* (2013.01); *B32B 15/013* (2013.01); *Y02P 10/295* (2015.11); *Y10T 29/49746* (2015.01); *Y10T 29/49986* (2015.01)

(58) Field of Classification Search
CPC ... Y02P 10/295; B29C 33/38; B29C 33/3842; B29C 41/20; B32B 3/10; B32B 15/01; C23C 4/06; Y10T 428/24917
See application file for complete search history.

(56) References Cited

U.S. PATENT DOCUMENTS 6,472,029 B1* 10/2002 Skszek .................. B23K 26/03
                                                    427/133
2009/0308847 A1* 12/2009 Kamimura ......... B23K 15/0086
                                                    219/76.1

FOREIGN PATENT DOCUMENTS

| DE | 102005031584 A1 | 1/2007 |
| EP | 0221752 A2 | 5/1987 |
| WO | 2001085386 A2 | 11/2001 |
| WO | 2009/077524 A2 | 6/2009 |
| WO | 2009090622 A1 | 7/2009 |

* cited by examiner

PROCESS FOR LASER-ASSISTED TOOL BUILD AND REPAIR

CROSS-REFERENCE TO PRIOR APPLICATION

This application is a national stage application filing under 35 U.S.C. §371 of and claims benefit under 35 USC §365(c) to PCT/CA2013/000321, filed on Apr. 4, 2013, which claims priority to and benefit of U.S. Provisional Application No. 61/624,562, filed on Apr. 16, 2012.

FIELD OF THE INVENTION

The instant invention relates generally to a process for building tools, such as for instance the dies and molds that are used in the automotive and other manufacturing industries. More particularly the instant invention relates to a process for laser cladding tool-steel alloys onto base structures that are made of cast iron or other low-grade castable materials, for forming or repairing features on the forming surfaces of such tools, and also to the tools that are fabricated using said process.

BACKGROUND OF THE INVENTION

Dies and molds are examples of tools that are used in the automotive and other manufacturing industries. Such tools have forming surfaces that are equipped with features for producing a finished product with a desired shape or design. For instance, a die that is used for producing automotive body panels may include a punch and die block assembly having forming surfaces including complementary, opposing surface features. The die parts are mounted in a press, charged with a sheet-metal blank, and then brought together under operating tonnage in order to deform the sheet metal blank therebetween. As the die parts are brought together, the sheet metal blank is stretched and made to conform to the shape of the features that are present on the forming surfaces of the die parts. In this way, automotive body panels having "Tornado Lines" or other design features can be formed.

The fabrication of dies and molds requires significant machining in order to remove unnecessary bulk wrought or cast material, so as to form the forming surfaces having the desired features for making a finished product. Typically, the bulk wrought material is a relatively expensive tool steel alloy or iron. In fact, the cost of producing a finished tool is attributed mainly to the material cost and the amount of machining work that is required. Unfortunately, the process of stretching and deforming sheet metal blanks abrades the forming surfaces of the tool, resulting in considerable "wear and tear" and thereby limiting the useful lifetime of such tools. In particular, sharp features that are used to produce "Tornado Lines" or other similar designs are highly susceptible to wear. This is because the sheet metal blank slides, relative to the sharp features of the tool, to a greater extent than occurs within other portions of the tool, and because the sharp features are more fragile and thus more susceptible to damage and wear compared to other surface portions of the tool. In order to extend the useful lifetime of such tools, it is known to subject sharp features to heat treatment processing in order to increase the material hardness, and thus the wear resistance, of the sharp features. Eventually, however, the tool becomes so worn as to be unusable and it must be repaired, or after a finite number of possible repairs—replaced, at considerable cost. Generally speaking, it is not cost-effective to refurbish such tools.

In WO 2009/077524, a process is described for producing tools from low cost materials, such as high resistance concrete, by casting the low cost material into a desired shape and then coating it with a metallic or ceramic layer. According to this approach, the material cost of the tool is reduced since low cost concrete is used in place of iron alloys, and machining requirements are reduced since only a relatively thin layer of deposited metal or ceramic needs to be removed to define the forming surfaces. Unfortunately, the tools that are produced using this method are somewhat fragile and although they are resistant against high compression loads, their resistance under tensile stress state is low. It is implied that the process is suitable for fabricating low cost tools when the tools do not need to have a very long life cycle.

In WO 2009/090622, a process is described for extending the lifespan of a metal cavity mold. In particular, the process is for repairing defects in molds that are used for making glass articles such as bottles. When a mold becomes worn or damaged a layer of metal is machined off the entire molding surface, then a layer of filler metal that is thicker than the layer of metal removed during the machining step is deposited onto the machined surface, and finally the filler material is machined to the design dimensions for molding the glass articles. Unfortunately, the entire molding surface must be machined in order to repair a defect, which increases cost. Further, it is stated that the filler material for forming the cladding layer must be metallurgically compatible with the cast iron of the mold. This requirement places a restriction on the types of materials that may be used for forming the cladding layer. Consequently, the ability to vary the material properties of the molding surface is limited.

Neither of the above-mentioned processes is suitable for fabricating tools for use in the high volume Class A automotive applications or other similar manufacturing industries. Additionally, neither of the above-mentioned processes achieves reduced material cost of the tool while at the same time allowing for the useful lifetime of the tool to be increased. Further, neither of the above-mentioned processes is suitable for fabricating tools from metallurgically incompatible materials, or from materials that have incompatible mechanical properties.

It would therefore be beneficial to provide a process for fabricating tools, and to provide tools fabricated according to said process, that overcome at least some of the above-mentioned limitations and disadvantages of the prior art.

SUMMARY OF THE INVENTION

According to an aspect of at least one embodiment of the instant invention, disclosed is a tool for forming a shaped product, the tool comprising: a support body fabricated from a first material, the first material of the support body defining a first portion of a forming surface of the tool; and, a feature supported on the support body, the feature comprising: a layer of a second material supported on the first material of the support body; a layer of a third material supported on the layer of the second material; and a layer of a fourth material supported on the layer of the third material, the layer of the fourth material defining a second portion of the forming surface of the tool, wherein during use the first portion of the forming surface and the second portion of the forming surface cooperate to form a desired shape of the shaped product.

According to an aspect of at least one embodiment of the instant invention, disclosed is a tool for forming a shaped product, the tool comprising: a support body having a machined surface defining a first portion of a forming surface of the tool; and a feature supported on the support body adjacent to the machined surface and defining a second portion of the forming surface, the feature comprising a plurality of layers including a top layer formed of a material that is metallurgically incompatible with, or does not form decent fusion bonding with, material of the machined surface of the support body, a bottom layer formed of a material that is metallurgically compatible with the material of the machined surface of the support body, and an intermediate layer formed of a material that is metallurgically compatible with the material of the top layer and with the material of the bottom layer, wherein during use the first portion of the forming surface and the second portion of the forming surface cooperate to form a desired shape of the shaped product.

According to an aspect of at least one embodiment of the instant invention, disclosed is a tool for forming a shaped product, the tool comprising: a support body fabricated from a first material and defining a support surface; a first feature comprising a plurality of layers of metallic alloys deposited one on top of another so as to define a bonding layer supported on the first material, a transitional layer supported on the bonding layer, and a functional layer supported on the transitional layer; and a second feature comprising a plurality of layers of metallic alloys deposited one on top of another so as to define a bonding layer supported on the first material, a transitional layer supported on the bonding layer, and a functional layer supported on the transitional layer, wherein the functional layer of the first feature is fabricated from a first metallic alloy having first material properties and the functional layer of the second feature is fabricated from a second metallic alloy having second material properties, the second material properties different than the first material properties.

According to an aspect of at least one embodiment of the instant invention, disclosed is a process for building a tool, comprising: providing a support body fabricated from a first material; machining a portion of the first material from the support body so as to define a first portion of a forming surface of the tool; and depositing onto the support body a feature defining a second portion of the forming surface of the tool, comprising: depositing a layer of a second material onto the first material of the support body; depositing a layer of a third material onto the layer of the second material; and depositing a layer of a fourth material onto the layer of the third material, the layer of the fourth material defining a second portion of the forming surface of the tool.

According to an aspect of at least one embodiment of the instant invention, disclosed is a process for building a tool, comprising: providing a support body fabricated from a first material; machining a portion of the first material from the support body so as to define a machined surface; forming, within a first region of the machined surface, a first feature comprising a plurality of layers of metallic alloys deposited one on top of another so as to define a bonding layer supported on the first material, a transitional layer supported on the bonding layer, and a functional layer supported on the transitional layer; and forming, within a second region of the machined surface, a second feature comprising a plurality of layers of metallic alloys deposited one on top of another so as to define a bonding layer supported on the first material, a transitional layer supported on the bonding layer, and a functional layer supported on the transitional layer, wherein the functional layer of the first feature is formed using a first metallic alloy having predetermined first material properties and the functional layer of the second feature is formed using a second metallic alloy having predetermined second material properties, the first material properties different than the second material properties.

According to an aspect of at least one embodiment of the instant invention, disclosed is a process for repairing a defect in a tool, the tool having a support body fabricated from a first material and having a feature comprising a first metallic alloy layer deposited on the support body, a second metallic alloy layer deposited on the first metallic alloy layer, and a third metallic alloy layer deposited on the second metallic alloy layer, the defect being within the third metallic alloy layer, the process comprising: removing at least a portion of the third metallic alloy layer including the defect; depositing, where the at least the portion of the of the third metallic alloy layer was removed, a quantity of the third metallic alloy, the depositing performed by laser cladding and the quantity deposited being sufficient to exceed a design dimension of the feature; and machining the deposited third metallic alloy to achieve substantially the design dimension of the feature.

According to an aspect of at least one embodiment of the instant invention, disclosed is a process for re-purposing a tool, comprising: providing a tool having a forming surface with a first configuration, the tool fabricated from a first material; using laser cladding, depositing a feature onto the forming surface of the tool, comprising: depositing a layer of a second material onto the first material of the tool; depositing a layer of a third material onto the layer of the second material; and depositing a layer of a fourth material onto the layer of the third material, the layer of the fourth material defining a second portion of the forming surface of the tool, wherein the feature is deposited onto a portion of the forming surface that other than corresponds to a location of an existing feature of the forming surface, such that the forming surface has a second configuration different than the first configuration subsequent to depositing the feature.

BRIEF DESCRIPTION OF THE DRAWINGS

The instant invention will now be described by way of example only, and with reference to the attached drawings, wherein similar reference numerals denote similar elements throughout the several views, and in which:

FIG. 1b shows a simplified cross section taken along the line A-A in FIG. 1a.

FIG. 3b shows enlarged detail of the structure within the dashed circle of FIG. 3a.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1A:
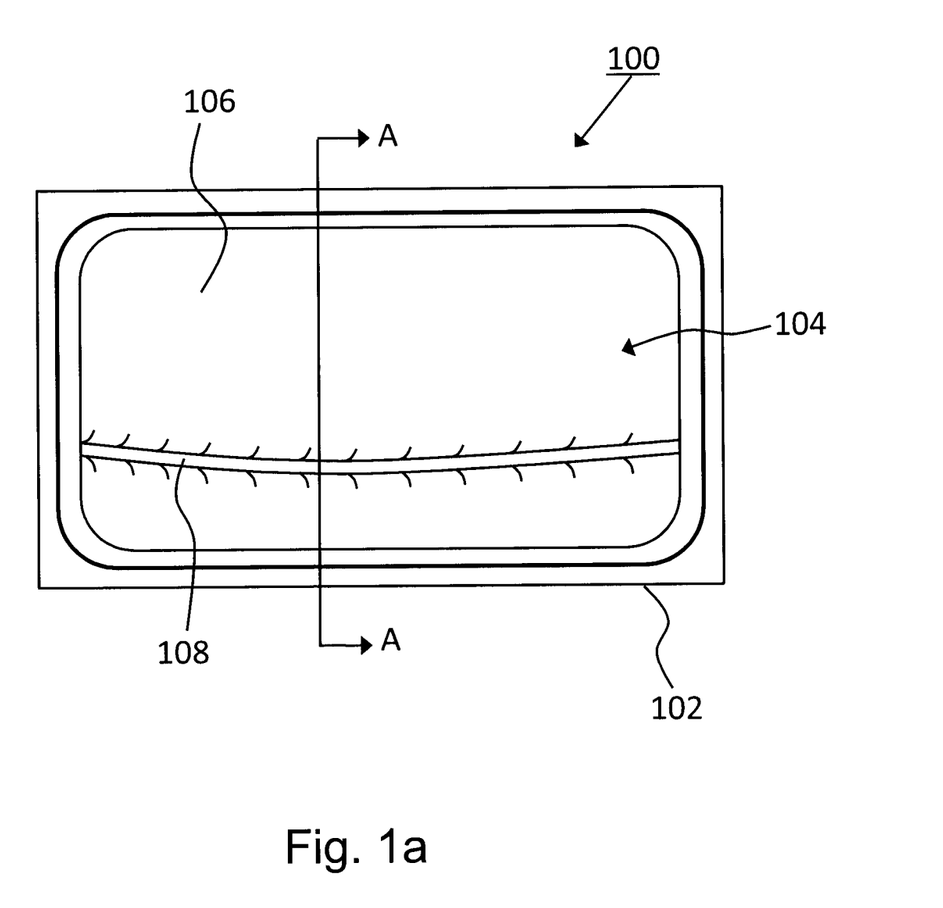
FIG. 1a shows a simplified top view of a tool having a feature within a forming surface thereof.

Referring to FIG. 1a, shown is a simplified top view of a tool having a feature that is defined within a forming surface thereof, the feature deposited using a laser-assisted tool build process according to an embodiment of the instant invention. The tool 100 comprises a support body 102 that is shaped to define a forming surface 104, which is configured for forming a shaped product having a desired shape. The forming surface 104 includes a first portion 106. Further, a feature 108 is provided within the forming surface 104, the feature 108 defining a second portion of the forming surface 104. During use, the first portion 106 of the forming surface 104 and the second portion of the forming surface 104, as defined by the feature 108, cooperate to form the shaped product having the desired shape. For instance, the tool 100 is for forming an automotive body panel with a Tornado Line design element.

Figure 1B:
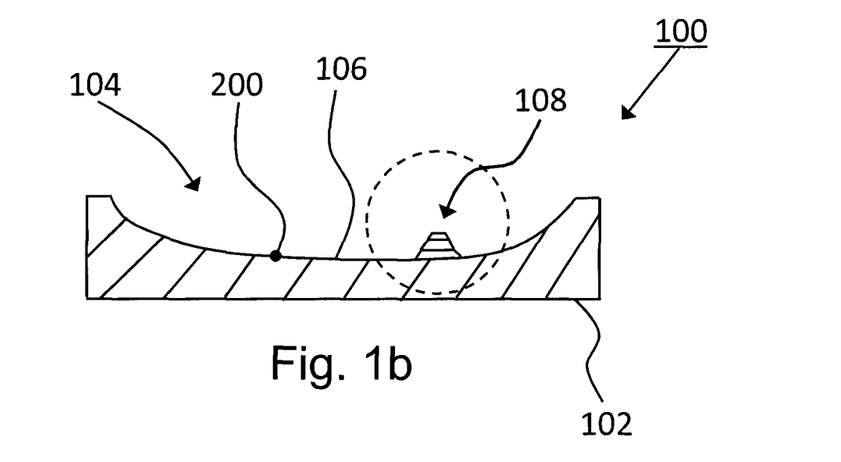

Referring now to FIG. 1b, shown is a simplified cross sectional view of the tool 100 of FIG. 1a, taken along the line A-A. As is shown in FIG. 1b, the support body 102 is fabricated from a first material, such as for instance cast iron. The use of cast iron to fabricate the support body 102 reduces the overall material cost of the tool 100 compared to tools that are fabricated using higher-grade materials, such as for instance tool steel. Of course, other suitable materials may be used instead of cast iron. As is further shown in FIG. 1b, the support body 102 is machined to produce a surface 200 that approximates the required final shape of the forming surface 104. Optionally, the first material is cast to approximately the required final shape, and additional machining is performed only as necessary to achieve the required final shape. Advantageously, the hardness of cast iron is lower than the hardness of tool steel, and therefore it is easier to machine the surface 200 when the support body 102 is fabricated from cast iron instead of tool steel. In the instant embodiment, the machined surface 200 of the cast iron support body 102 defines the first portion 106 of the forming surface 104. Optionally, as discussed in greater detail below, the machined surface is covered with another material having desired material properties.

Figure 1C:
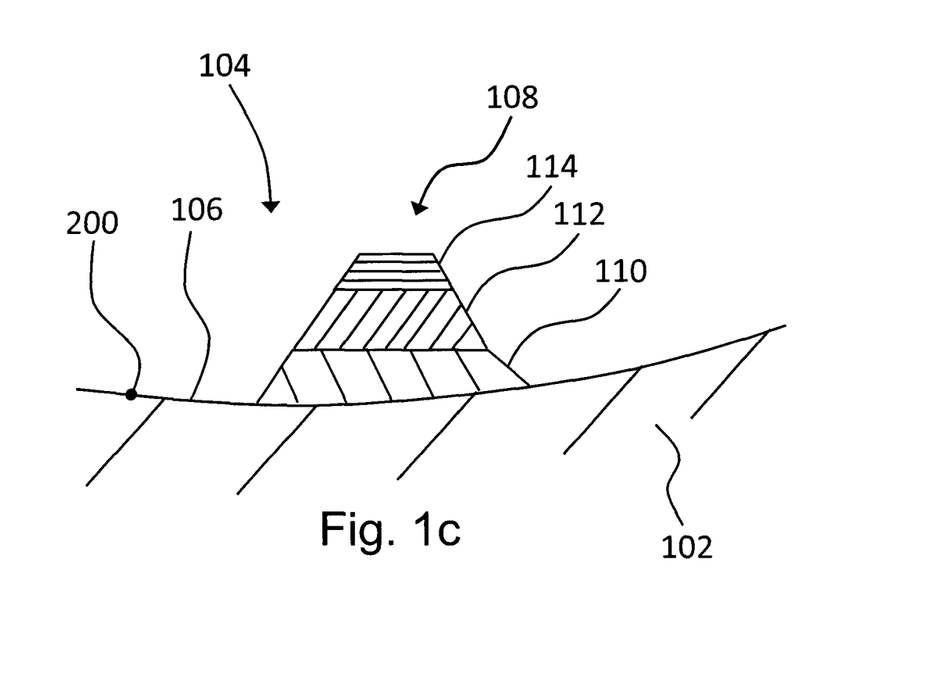
FIG. 1c is an enlarged view of the features within the dashed circle of FIG. 1b.

The feature 108 of FIG. 1a, which defines the second portion of the forming surface 104, is shown within the dashed circle in FIG. 1b. An enlarged cross-sectional view of the feature 108 is shown in FIG. 1c. Referring now to FIG. 1b and FIG. 1c, the feature 108 is not fabricated from the first material, but rather it comprises plural layers of metallic alloys. In other words, the feature 108 is built on top of the machined surface 200 by laser deposition (cladding). Cladding is the process of bonding together metals, both similar and dissimilar, and is distinct from welding or gluing as a method to fasten the metals together. In laser cladding a powdered or wire feedstock material is melted and consolidated, by use of a laser, in order to coat part of a substrate or to fabricate a near-net shape part. By correctly selecting the material or combination of materials to be deposited, the features that are built by laser cladding can have the desired mechanical properties. Further, by using a variety of alloy materials different features can be built that have different mechanical properties.

That being said, laser cladding of tool steel alloys onto cast iron or other tool materials is not a straightforward process, and may result in the formation of a clad layer with undesirable cracks and/or porosity under certain circumstances. The formation of defects within the clad layer is attributable to differences in the mechanical and/or thermal properties of the cast iron material and tool steel alloys, as well as the compatibility between these two materials when they are fused together. In a process according to an embodiment of the instant invention, a three-layer deposition of metal alloys onto a cast iron or other suitable support body can be used to produce features having desired mechanical properties and without undesirable cracks and/or porosity. With reference to FIGS. 1b and 1c, the three layers include; a bonding layer 110; a transitional layer 112 and a functional layer 114.

Figure 2A:
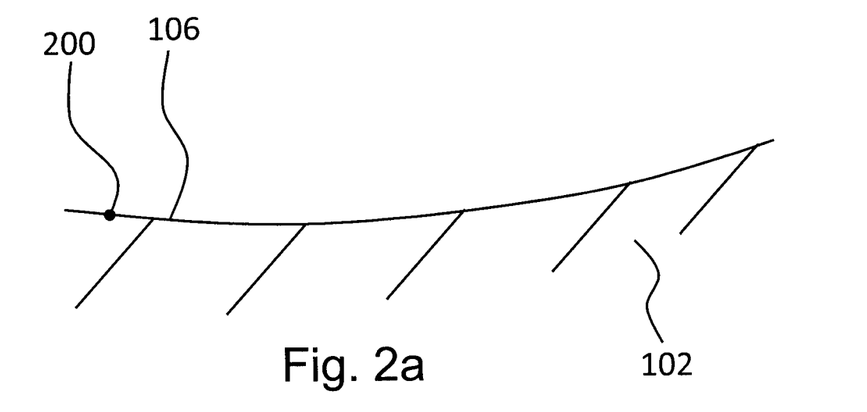
FIG. 2a is a simplified cross sectional view showing a surface region of a support body, prior to laser-assisted tool building using a process according to an embodiment of the instant invention.

Referring now to FIGS. 2a-d, shown are simplified cross sectional views depicting different stages of a tool-build process according to an embodiment of the instant invention. As noted above, lower grade materials such as for instance cast iron could be used instead of tool steel alloy for constructing the support body 102. FIG. 2a shows a portion of the support body 102, subsequent to machining being performed to produce the machined surface 200. In particular, FIG. 2a shows a portion of the machined surface 200 upon which the feature 108 is to be deposited.

Figure 2B:
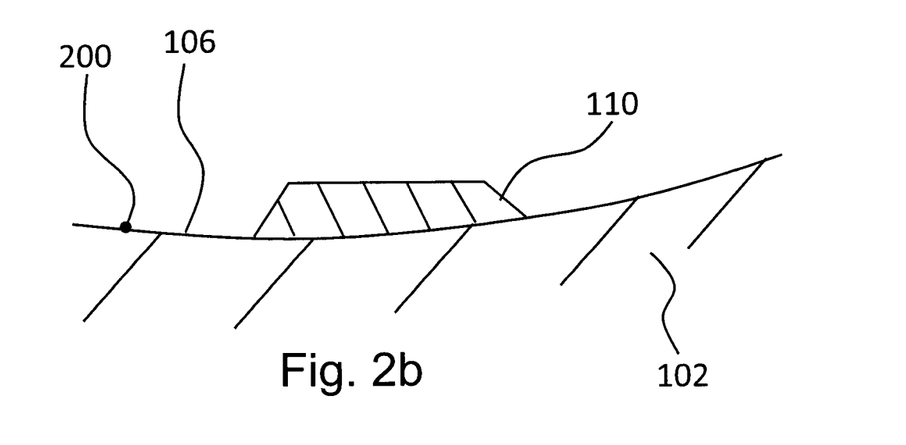
FIG. 2b is a simplified cross sectional view showing the surface region of FIG. 2a subsequent to deposition of a bonding layer during laser-assisted tool building.

Referring now to FIG. 2b, shown is the portion of the support body 102 subsequent to deposition of a bonding layer 110 using laser cladding. In particular, the bonding layer is fabricated from a material that exhibits good wettability with the cast iron or other material of the support body 102. In the instant example, when the support body 102 is fabricated from cast iron, the bonding layer 110 may be fabricated from, for instance, a cobalt-based alloy, such as Stellite 21.

Figure 2C:
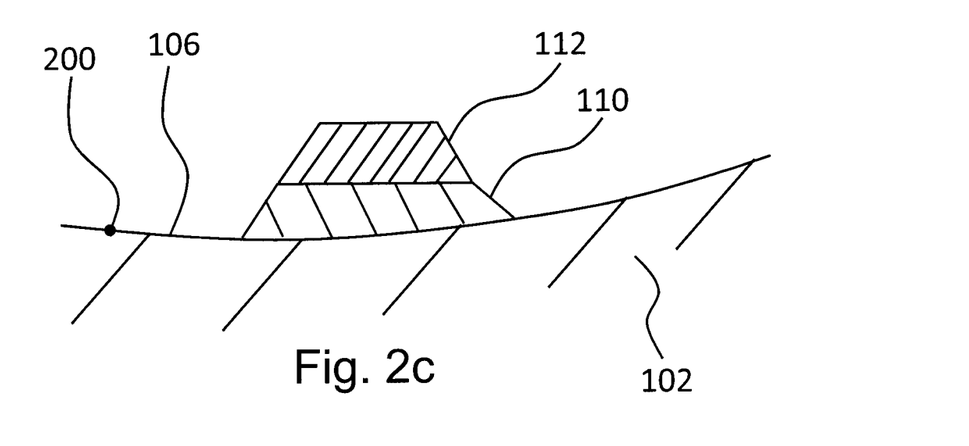
FIG. 2c is a simplified cross sectional view showing the surface region of FIG. 2a subsequent to deposition of a transitional layer onto the bonding layer during laser-assisted tool building.

Referring now to FIG. 2c, shown is the portion of the support body 102 subsequent to deposition of a transitional layer 112 onto the bonding layer 110. In the instant example, the transitional layer 112 is fabricated from an iron-based tool steel alloy of moderate hardness and high toughness.

Figure 2D:
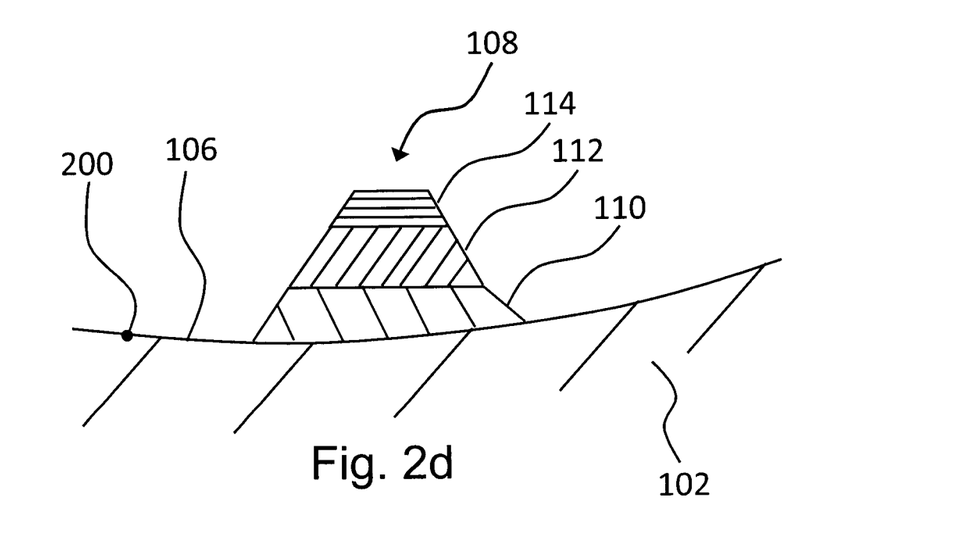
FIG. 2d is a simplified cross sectional view showing the surface region of FIG. 2a subsequent to deposition of a functional layer onto the transitional layer during laser-assisted tool building.

Referring now to FIG. 2d, shown is the portion of the support body 102 subsequent to deposition of a functional layer 114 onto the transitional layer 112. In particular, the functional layer 114 provides mechanical properties that are required for the intended application of the tool 100. In the instant example, the functional layer 114 is fabricated from a tool steel alloy of required hardness. Subsequent to depositing the functional layer 114, machining is performed as necessary in order to finalize the configuration of the forming surface of the tool 100, based on a desired shape of the shaped product that is to be fabricated using the tool 100. Optionally, additional functional layer material is deposited in order to achieve a desired thickness of the functional layer 114.

The process that is shown with reference to FIGS. 2a-2d has been described in terms of a specific and non-limiting example in which three metal alloy layers are deposited onto a cast iron support body 102 using laser cladding. Optionally, additional layers in excess of the three layers that are described with reference to FIGS. 2a-2d may be deposited during forming of the feature 108 on the forming surface of the tool 100.

In general, the three metal-alloy layers 110, 112 and 114 provide a stepped transition of material properties between the support body 102 and the functional layer 114. Using the process that is described with reference to FIGS. 2a-2d, features having a functional layer 114 fabricated from a material with mechanical properties that are different than the mechanical properties of the material of the support body 102 may be built, in which the functional layer 114 is substantially free of cracks and porosity. The functional layer 114 is, for instance, fabricated from a metal alloy that is highly resistant to wear. In this way, a low cost material may be used to form the support body 102 and to define a first portion 106 of the forming surface 104, which is not subjected to significant wear and abrasion during forming of the shaped product. Features or regions that are subjected to significant wear and abrasion during forming of the shaped product are built-up according to the process that is described with reference to FIGS. 2a-2d. The functional layer 114 of such built up features may be fabricated from a wear resistant metal alloy. Since the built up features could be more highly wear resistant, and the other portions of the forming surface 104 may not be subjected to significant wear and abrasion, the overall lifespan of a tool that is fabricated according to the process that is described above could be comparable to the lifespan of a tool that is fabricated entirely from higher-grade materials. As such, the process that is described with reference to FIGS. 2a-2d could support the building of tools with lower material cost and lower machining cost, but without sacrificing the lifespan of the tool or requiring significant additional maintenance during the lifespan of the tool.

Figure 3A:
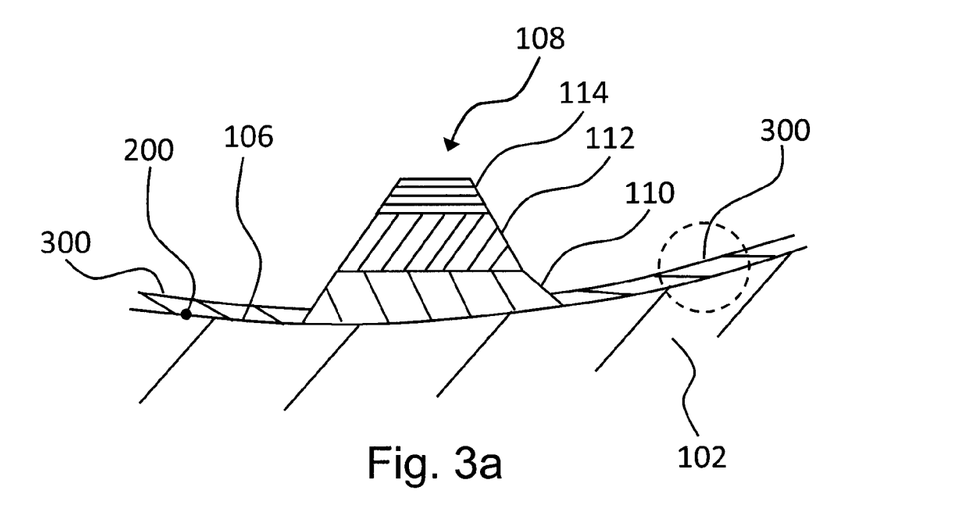
FIG. 3a is a simplified cross sectional view showing a first feature and a second feature deposited onto a support body by laser cladding, according to another embodiment of the instant invention.
Figure 3B:
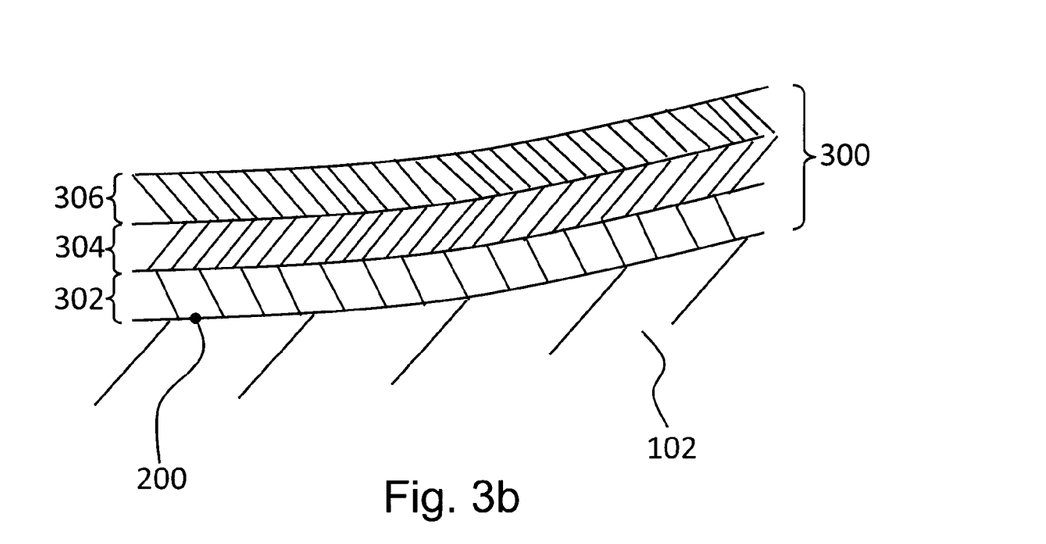

Referring now to FIG. 3a, shown is an enlarged cross-sectional view of a portion of a forming surface of a tool that is fabricated according to a variation of the process that is described with reference to FIGS. 2a-2d. In addition, FIG. 3b shows enlarged detail of the structure within the dashed circle of FIG. 3a. In particular, feature 108 is formed on machined surface 200 of support body 102, substantially as described above with reference to FIGS. 2a-2d. Additionally, a second feature 300 is deposited onto portions of the machined surface 200 that are adjacent to the feature 108. In this example the second feature 300 is deposited in the form of a thin, surface coating comprising three layers of metallic alloys, which include: a bonding layer 302 fabricated from a first metallic alloy that exhibits good wettability with the material of the support body 102; a transitional layer 304 fabricated from a second metallic alloy; and a functional layer 306 fabricated from a third metallic alloy that has desired mechanical properties. For instance, the second feature 300 is deposited in order to provide higher wear resistance over the portions of the forming surface of the tool that are adjacent to the feature 108. Optionally, the second feature 300 extends over substantially the entire forming surface of the tool, or the second feature 300 extends over only selected portions of the forming surface that are expected to be subjected to high wear and abrasion during forming of the shaped-product using the tool. In this example, the feature 300 and the feature 108 define contiguous surface portions of the forming surface of the tool.

Figure 4:
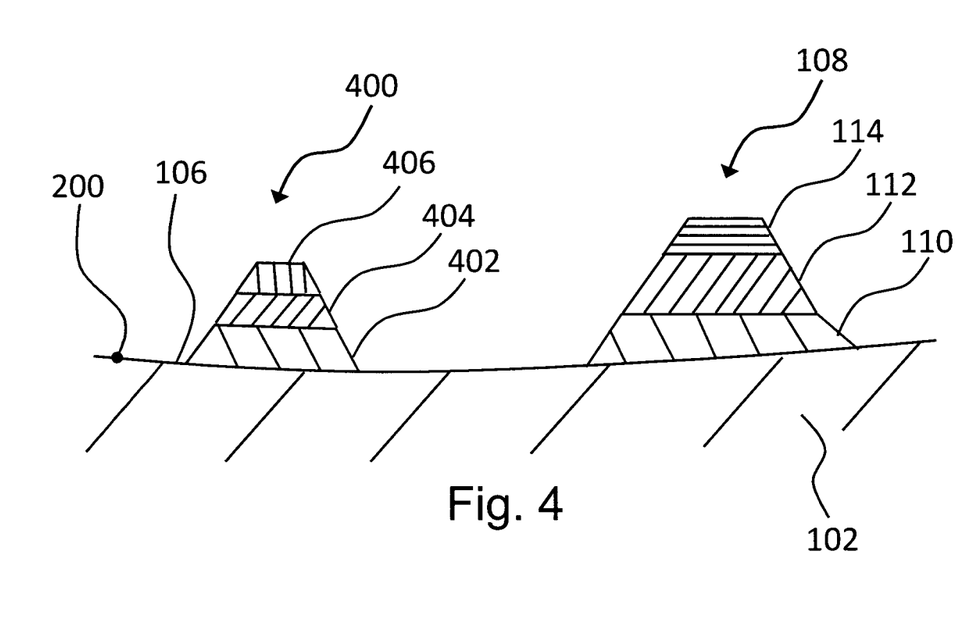
FIG. 4 is a simplified cross sectional view showing a first feature and a second feature deposited onto a support body by laser cladding, according to another embodiment of the instant invention.

Referring now to FIG. 4, shown is an enlarged cross-sectional view of a portion of a forming surface of a tool that is fabricated according to another variation of the process that is described with reference to FIGS. 2a-2d. In particular, feature 108 is formed on machined surface 200 of support body 102, substantially as described above with reference to FIGS. 2a-2d. In addition, a second feature 400 is deposited onto a portion of the machined surface 200 adjacent to, and spaced-apart from, the feature 108. The second feature 400 is substantially similar to the feature 108, and includes: a bonding layer 402 fabricated from a first metallic alloy that exhibits good wettability with the material of the support body 102; a transitional layer 404 fabricated from a second metallic alloy; and a functional layer 406 fabricated from a third metallic alloy that has desired mechanical properties. The second feature 400 forms a third portion of the forming surface of the tool 102. In this example, the feature 108 and the second feature 400 define non-contiguous portions of the forming surface of the tool 102. That being said, the first portion of the forming surface 106 is contiguous with the forming surfaces defined by both the feature 108 and the second feature 400. Further, in this example the functional layer 406 of the second feature 400 and the functional layer 114 of the feature 108 are formed from different alloys. For instance, the functional layer 406 is fabricated from a tool steel alloy having higher wear resistance than the material that is used to form the functional layer of the feature 108. In this example, the bonding layers 110 and 402 of the features 108 and 400 are fabricated from the same metallic alloy, and the transitional layers 112 and 404 of the features 108 and 400 are fabricated from the same metallic alloy. Optionally, the bonding layers and/or the transitional layers of the features 108 and 400 are fabricated from different alloys. For instance, different metallic alloys are selected in order to ensure metallurgical compatibility.

In the embodiments that are described with reference to FIGS. 1 to 4, the material of the functional layer is metallurgically compatible with the material of the support base. For instance, the material of the functional layer is an iron-based tool steel alloy and the material of the support base is cast iron. Despite being metallurgically compatible, it is nevertheless expected that the functional layer will contain cracks and undesired porosity if it is deposited directly onto the support body 102 using laser cladding. The incompatibility in this case is attributable to the differences in material properties; for instance, the hardness of the tool steel functional layer is much greater than the hardness of the cast iron support body in this specific and non-limiting example. The bonding layer and transitional layers are deposited onto the support body 102 prior to depositing the functional layer 114, so as to provide a stepped transition of material properties between the support body 102 and the functional layer 114, and thereby allow the formation of the functional layer 114 substantially free of cracks and undesired porosity.

In other systems, the material of the functional layer may be metallurgically incompatible with the material of the support body. The same process that is described above may also be used to form structures that include metallurgically incompatible materials. For instance, the material of a bonding layer is selected to be metallurgically compatible with the material of the support base, and the material of a transitional layer is selected to be metallurgically compatible with both the material of the bonding layer and the material of a functional layer. In this way, laser cladding may be used to deposit the desired bonding layer onto the support body, and then to subsequently deposit the desired transitional layer onto the bonding layer and then to subsequently deposit the functional layer onto the transitional layer. With appropriate selection of the materials for each of the different layers, a functional layer can be formed that is substantially free of cracks and undesired porosity even if the material of the functional layer is metallurgically incompatible with the material of the support base.

Figure 5:
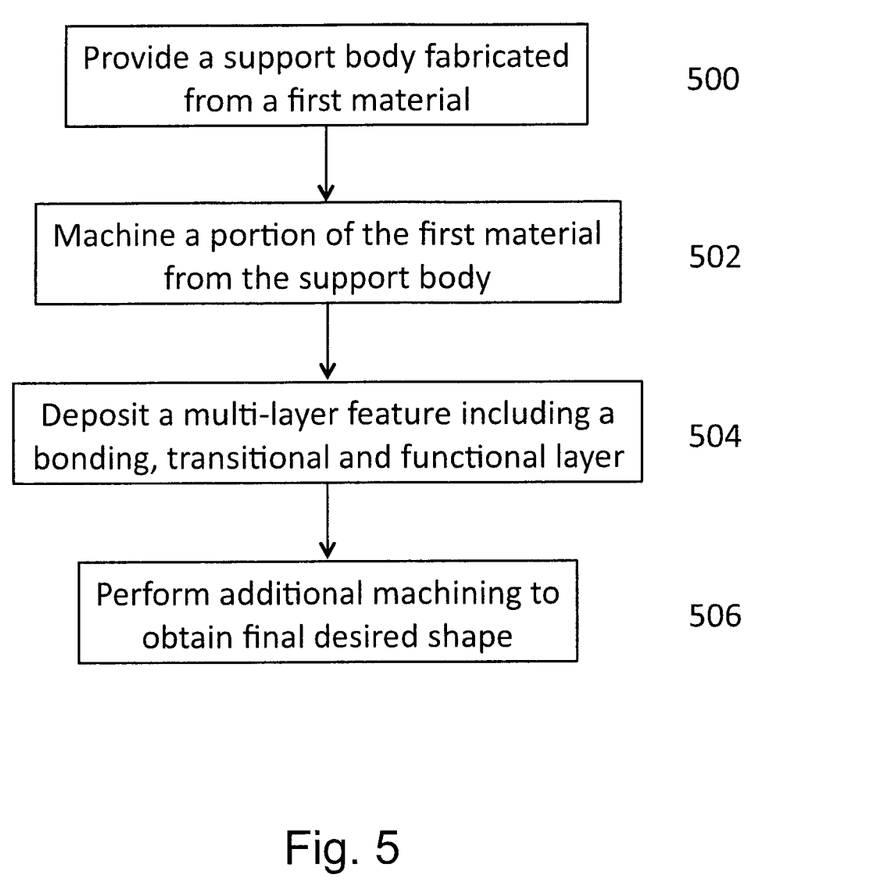
FIG. 5 is a simplified flow diagram of a process for building a tool, according to an embodiment of the instant invention.

Referring now to FIG. 5, shown is a simplified flow diagram of a process for building a tool, according to an embodiment of the instant invention. At 500 a support body, which is fabricated from a first material, is provided. For instance, the first material could be of a lower grade than tool steel, such as for instance cast iron. Optionally, the support body is cast approximately to a desired final shape, or the support body is provided in the form of a block. At 502 a portion of the first material is machined from the support body, so as to define a first portion of a forming surface of the tool. The amount of machining that is necessary depends upon whether the support body is cast approximately to the desired final shape, or is provided in the form of a block. At 504 a feature defining a second portion of the forming surface of the tool is deposited onto the support body. More particularly, depositing the feature comprises depositing a layer of a second material onto the first material of the support body, followed by depositing a layer of a third material onto the layer of the second material, and finally depositing a layer of a fourth material onto the layer of the third material. The second, third and fourth materials are deposited, one at a time, using laser cladding. The material that is being deposited is fed in the form of either a powder or a wire feedstock, which is melted using a laser and deposited onto a desired portion of the substrate. Depositing each of the layers optionally includes depositing multiple layers of the respective material, so as to attain a desired thickness of the deposited material. Optionally, the bonding, transitional and functional layers are of different thicknesses. At 506, additional machining is performed as necessary to obtain the desired final shape of the feature, and to finish the forming surface. During use, the layer of the fourth material defines a second portion of the forming surface of the tool, which cooperates with the first portion of the forming surface of the tool to produce a shaped-product having a desired shape.

Figure 6:
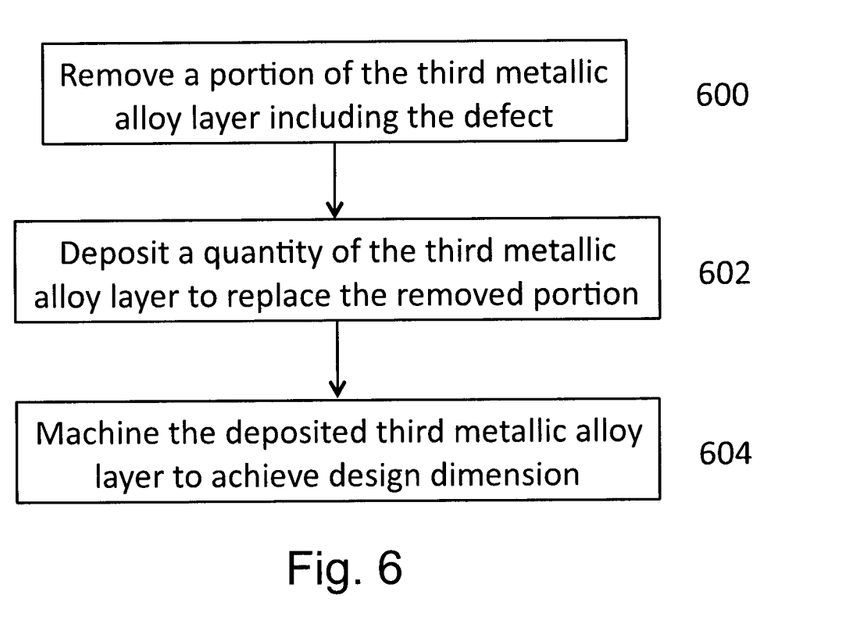
FIG. 6 is a simplified flow diagram of process for repairing a defect in a tool, according to an embodiment of the instant invention.

Referring now to FIG. 6, shown is a simplified flow diagram of a process for repairing a tool, according to an embodiment of the instant invention. More particularly, the process is for repairing a defect in a tool, the tool having a support body fabricated from a first material and having a feature comprising a first metallic alloy layer deposited on the support body, a second metallic alloy layer deposited on the first metallic alloy layer, and a third metallic alloy layer deposited on the second metallic alloy layer. In this specific and non-limiting example, it is assumed that additional layers of the third metallic alloy have been deposited on top of the three-layer feature, such that the thickness of the material of the third metallic alloy layer is sufficient to ensure that any defects and/or wear occurs within the third metallic alloy layer. That being said, in some instances it is possible that defects or wear may also extend into lower layers, such as the second metallic alloy layer or even the first metallic alloy layer.

Referring still to FIG. 6, at 600 at least a portion of the third metallic alloy layer, including the defect, is removed. For instance, the third metallic alloy layer is machined to remove at least some of the third metallic alloy. Optionally, the third metallic alloy layer is removed entirely. At 602, a quantity of the third metallic alloy is deposited to replace the at least the portion of the third metallic alloy layer that was removed. In particular, the third metallic alloy is deposited using laser cladding, whereby the third metallic alloy is fed in the form of either a powder or a wire feedstock, is melted using a laser, and is deposited to replace the at least the portion of the third metal alloy layer that was removed. The quantity of the third metallic alloy that is deposited is sufficient to exceed a design dimension of the feature that is being repaired. Subsequently, at 604 the deposited third metallic alloy is machined in order to achieve substantially the design dimension of the feature, wherein the design dimension is determined based on the desired shape of the shaped-product that is manufactured using the tool.

Figure 7:
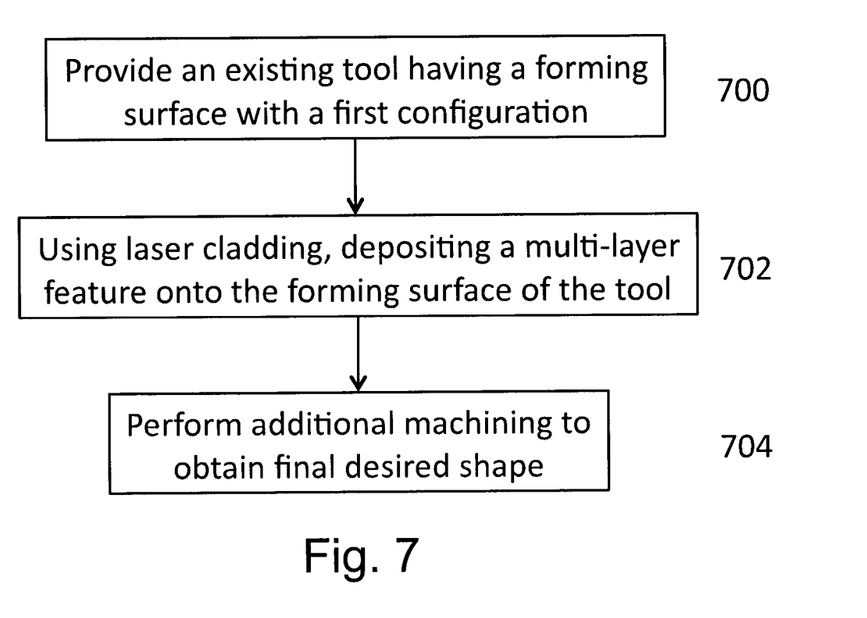
FIG. 7 is a simplified flow diagram of process for repurposing a tool, according to an embodiment of the instant invention.

Referring now to FIG. 7, shown is a simplified flow diagram of a process for re-purposing a tool, according to an embodiment of the instant invention. More particularly, the process of FIG. 7 relates to modifying the forming surface of an existing tool, such as for instance by depositing a feature within the forming surface. Optionally, one or more existing features are removed or modified, such as for instance by machining. At 700 a tool is provided, the tool being an existing tool having a forming surface with a first configuration, and the tool being fabricated from a first material. For instance, the first material is lower grade than tool steel, such as for instance cast iron. At 702, using laser cladding, a feature is deposited onto the forming surface of the tool. The step of depositing the feature comprises: depositing a layer of a second material onto the first material of the tool; depositing a layer of a third material onto the layer of the second material; and depositing a layer of a fourth material onto the layer of the third material. At 704, additional machining is performed to achieve a desired second configuration of the forming surface. The layer of the fourth material defines a portion of the forming surface of the tool. Further, the feature is deposited onto a portion of the forming surface that other than corresponds to a location of an existing feature of the forming surface, such that the second configuration of the forming surface is different than the first configuration, subsequent to depositing the feature.

By using lower grade materials for the support body, such as for instance cast iron, and by building features using laser cladding, the initial cost of building tools is reduced compared to prior art tool building processes. By selecting appropriate materials for building the features, claddings may be produced with desired mechanical properties for specific applications. In particular, tools may be built with assured longer service life of the features that are subjected to wear and abrasion. When defects or wear are detected, the tools may be repaired instead of being recycled, without compromising quality. Such repairs may proceed without any heat treatment or extensive machining, which saves time, energy and money. In some cases, it may be possible to modify features on an existing tool instead of building an entirely new tool, thereby allowing obsolete tools to be repurposed instead of being recycled.

While the above description constitutes a plurality of embodiments of the present invention, it will be appreciated that the present invention is susceptible to further modification and change without departing from the fair meaning of the accompanying claims.

What is claimed is:

1. A tool for forming a shaped product, the tool comprising:
   a support body made of a material having a machined surface defining a first portion of a forming surface of the tool; and
   a feature formed on the machined surface of the support body, said feature being adjacent to the first portion of the forming surface and defining a second portion of the forming surface, said feature comprising a bottom layer, an intermediate layer formed on the bottom layer and a top layer formed on the intermediate layer, said top layer formed of a material that is metallurgically incompatible with the material of the machined surface of the support body, said bottom layer formed of a material that is metallurgically compatible with the material of the machined surface of the support body, and said intermediate layer formed of a material that is metallurgically compatible with the material of the top layer and with the material of the bottom layer,
   wherein during use the first portion of the forming surface and the second portion of the forming surface cooperate to deform a blank, to thereby form the shaped product with a desired shape from the blank.

2. The tool of claim 1 wherein the bottom layer, the intermediate layer and the top layer of the feature are deposited sequentially by laser cladding.

3. The tool of claim 1 wherein the bottom layer forms a bonding layer, the intermediate layer forms a transitional layer, and the top layer forms a functional layer.

4. The tool of claim 1 wherein the material of the top layer has a hardness that is greater than a hardness of the material of the machined surface of the support body.

5. The tool of claim 1 wherein the tool is a part of one of a die and a mold.

6. The tool of claim 1 wherein, during use, the first portion of the forming surface and the second portion of the forming surface cooperate to define at least a portion of a sharp class A feature within the shaped product.

7. The tool of claim 1 wherein the first portion of the forming surface and the second portion of the forming surface are contiguous forming surface portions.

8. A tool for forming a shaped product, the tool comprising:
   a support body made of a material having a machined surface defining a first portion of a forming surface of the tool;
   a first feature supported on the material of the support body adjacent to the first portion of the forming surface and defining a second portion of the forming surface, the first feature comprising a plurality of layers including a top layer formed of a material that is metallurgically incompatible with the material of the support body, a bottom layer formed of a material that is metallurgically compatible with the material of the support body, and an intermediate layer formed of a material that is metallurgically compatible with the material of the top layer and with the material of the bottom layer,
   wherein during use the first portion of the forming surface and the second portion of the forming surface cooperate to form a desired shape of the shaped product,
   wherein the bottom layer is a bonding layer supported on the material of the support body, the intermediate layer is a transitional layer supported on the bonding layer, and the top layer is a functional layer supported on the transitional layer; and
   the tool further comprising:
   a second feature defining a third portion of the forming surface and comprising a plurality of layers of metallic alloys deposited one on top of another so as to define a bonding layer supported on the material of the support body, a transitional layer supported on the bonding layer, and a functional layer supported on the transitional layer,
   wherein the functional layer of the first feature is fabricated from a first metallic alloy having first material properties and the functional layer of the second feature is fabricated from a second metallic alloy having second material properties, the second material properties different than the first material properties.

9. The tool of claim 8 wherein the second and third portions of the forming surface are contiguous surface portions of the forming surface of the tool.

10. The tool of claim 8 wherein the second and third portions of the forming surface are non-contiguous surface portions of the forming surface of the tool.

11. The tool of claim 8 wherein the functional layer of the second feature is a top layer formed of a material that is metallurgically incompatible with the material of the support body, the bonding layer of the second feature is a bottom layer formed of a material that is metallurgically compatible with the material of the support body, and the transitional layer of the second feature is an intermediate layer formed of a material that is metallurgically compatible with the material of the top layer of the second feature and with the material of the bottom layer of the second feature.

12. The tool of claim 8 wherein the bonding layer, the transitional layer and the functional layer of each one of the first and second features are deposited by laser cladding.

13. The tool of claim 8 wherein the material of the support body including the 56-machined surface is cast iron, the metallic alloy of the bonding layer of the first and second feature is a cobalt-based alloy, the metallic alloy of the transitional layer of the first and second feature is an iron-based alloy with high toughness, the metallic alloy of the functional layer of the first feature is a tool-steel alloy having the first material properties, and the metallic alloy of the functional layer of the second feature is a tool-steel alloy having the second material properties.

* * * * *